(12) United States Patent
Kubik

(10) Patent No.: US 6,523,425 B1
(45) Date of Patent: Feb. 25, 2003

(54) SPEED SENSOR RETAINING AND ASSEMBLY

(75) Inventor: James M. Kubik, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 09/552,013

(22) Filed: Apr. 19, 2000

(51) Int. Cl.7 .............................................. G01D 11/30
(52) U.S. Cl. ........................................ 73/866.5; 73/493
(58) Field of Search ............................... 73/866.5, 493, 73/121, 129; 324/173–175

(56) References Cited

U.S. PATENT DOCUMENTS

| | | | |
|---|---|---|---|
| 4,090,099 A | | 5/1978 | Daffron |
| 5,063,345 A | * | 11/1991 | Akiyama ............... 324/173 |
| 5,451,869 A | * | 9/1995 | Alff ............... 324/173 |
| 5,756,894 A | * | 5/1998 | Paolo et al. ............... 73/866.5 |
| 6,065,359 A | * | 5/2000 | Takanashi et al. ............... 73/866.5 |

FOREIGN PATENT DOCUMENTS

| | | | |
|---|---|---|---|
| DE | 2111 499 | | 3/1971 |
| DE | 27 15 426 | | 4/1977 |
| DE | 3613135 | | 4/1986 |
| DE | 43 31 795 A1 | | 9/1993 |
| JP | 402187625 | * | 7/1990 ............... 73/866.5 |

* cited by examiner

Primary Examiner—Robert Raevis
(74) Attorney, Agent, or Firm—Calfee, Halter & Griswold LLP

(57) ABSTRACT

A self-adjusting retention bushing and assembly for a vehicle anti-lock braking system using a resilient spring bushing with an integral locking prong is described. The locking prong is deflected and spring loaded to engage the sensor when the sensor is installed. The locking prong resists movement of the sensor relative to the bushing. The deflected locking prong also resists retraction of the bushing from the mounting block. The locking features prevent inadvertent movement of the sensor during assembly, repair or use.

9 Claims, 4 Drawing Sheets

SPEED SENSOR RETAINING AND ASSEMBLY

TECHNICAL FIELD OF THE INVENTION

This invention generally relates to the attachment of wheel speed sensors to axle housings for vehicle antilock braking systems. More specifically, this invention relates to an adjustable wheel sensor retention system with locking features.

BACKGROUND

Vehicle antilock braking systems have established widespread usage on cars and trucks. It is well known that maximum braking traction and vehicle directional stability is achieved when only a small degree of relative slippage is allowed between the vehicle tires and pavement. In order to control slippage, antilock braking systems establish servo-feedback control of the brake system to minimize slippage during braking. A typical system uses an antilock braking controller to determine incipient wheel slip and modulates brake pressure based on wheel speed information determined from wheel speed sensors located on each braked wheel axle assembly. Each wheel speed sensor is usually mounted to an axle housing in close proximity to an exciter (often referred to as a "tone wheel"), which is mounted to the wheel hub and rotates with the wheel. The wheel speed sensors may use various sensing principles such as magnetic reluctance, Hall effect or optics as known in the art. It is critical that the wheel speed sensors, particularly passive sensors such as the magnetic reluctance type, be located with a precise clearance or air gap relative to the exciter or tone wheel to generate a sufficient electrical signal for input to the controller. The air gap between the sensor and exciter must typically be adjusted during the vehicle final assembly to assure the required air gap because of the various component and assembly tolerances within the axle assembly. The initial adjustment of the air gap and retention of the air gap calibration has proven difficult or costly with known wheel speed retention assemblies. Moreover, once the desired clearance is established, it is necessary that the air gap remain fixed during operation, despite the severe operating environment to which the sensor is exposed.

SUMMARY OF THE INVENTION

Accordingly, this invention provides for a speed sensor retention bushing and assembly for a vehicle anti-lock braking system which overcomes the problems and disadvantages of the conventional techniques in the art. The invention also provides for a self-adjusting type retention assembly with a locking feature which prevents inadvertent movement of the sensor during assembly, repair or use.

Briefly, the invention includes a resilient retention bushing with a locking prong which is deflected and spring loaded to engage the sensor when the sensor is installed. The locking prong resists movement of the sensor relative to the bushing. The deflected locking prong also resists retraction of the bushing from the mounting block which receives the sensor and bushing.

Further objects, features and advantages of the invention will become apparent from consideration of the following description and the appended claims when taken in connection with the accompanying drawings.

DESCRIPTION OF THE PRIOR ART

The following description of prior art designs serves to provide a background to facilitate a more complete explanation and understanding of the present invention.

Figure 1:
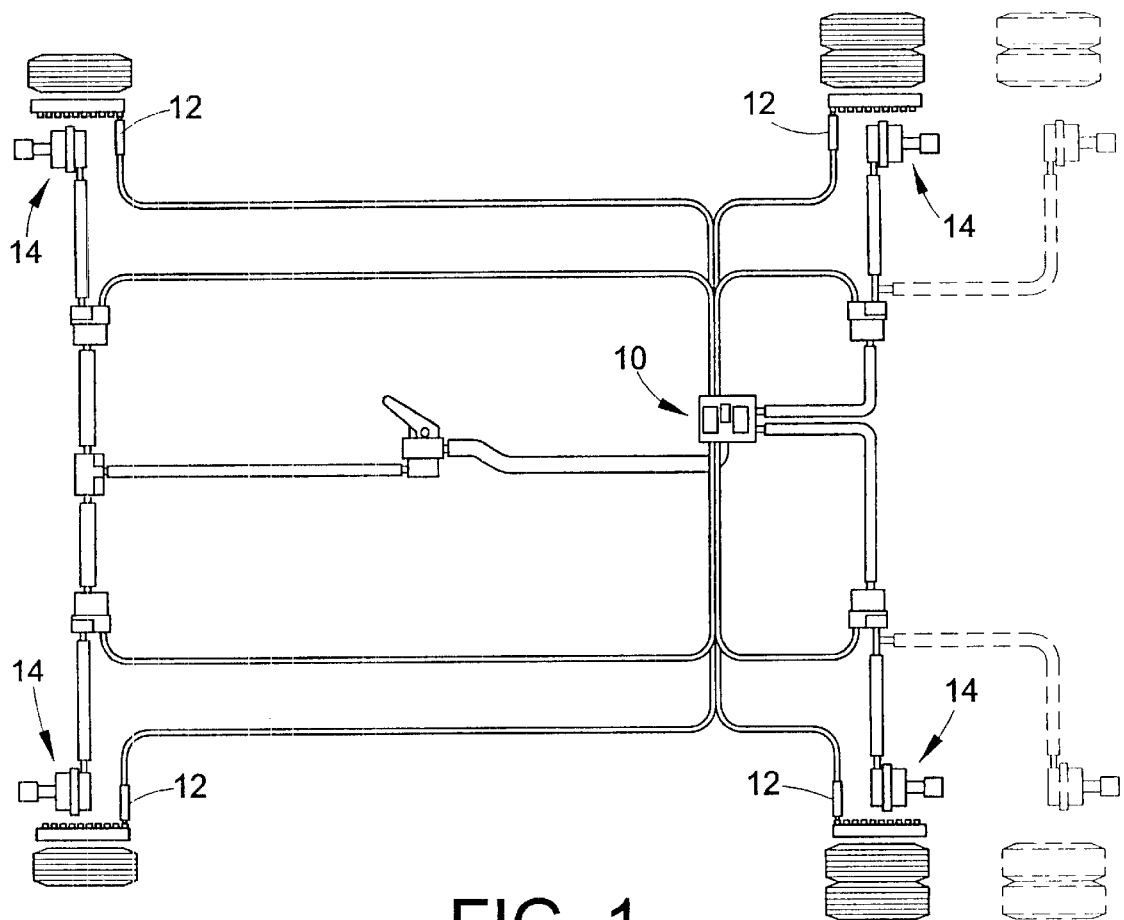
FIG. 1 is a schematic representation of a vehicle antilock braking system.
Figure 3:
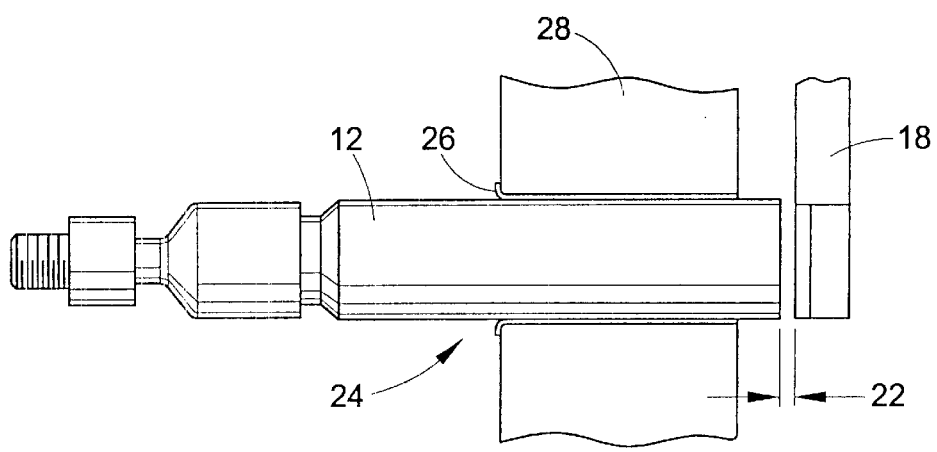
FIG. 3 shows the prior art sensor retainer bushing.
Figure 2:
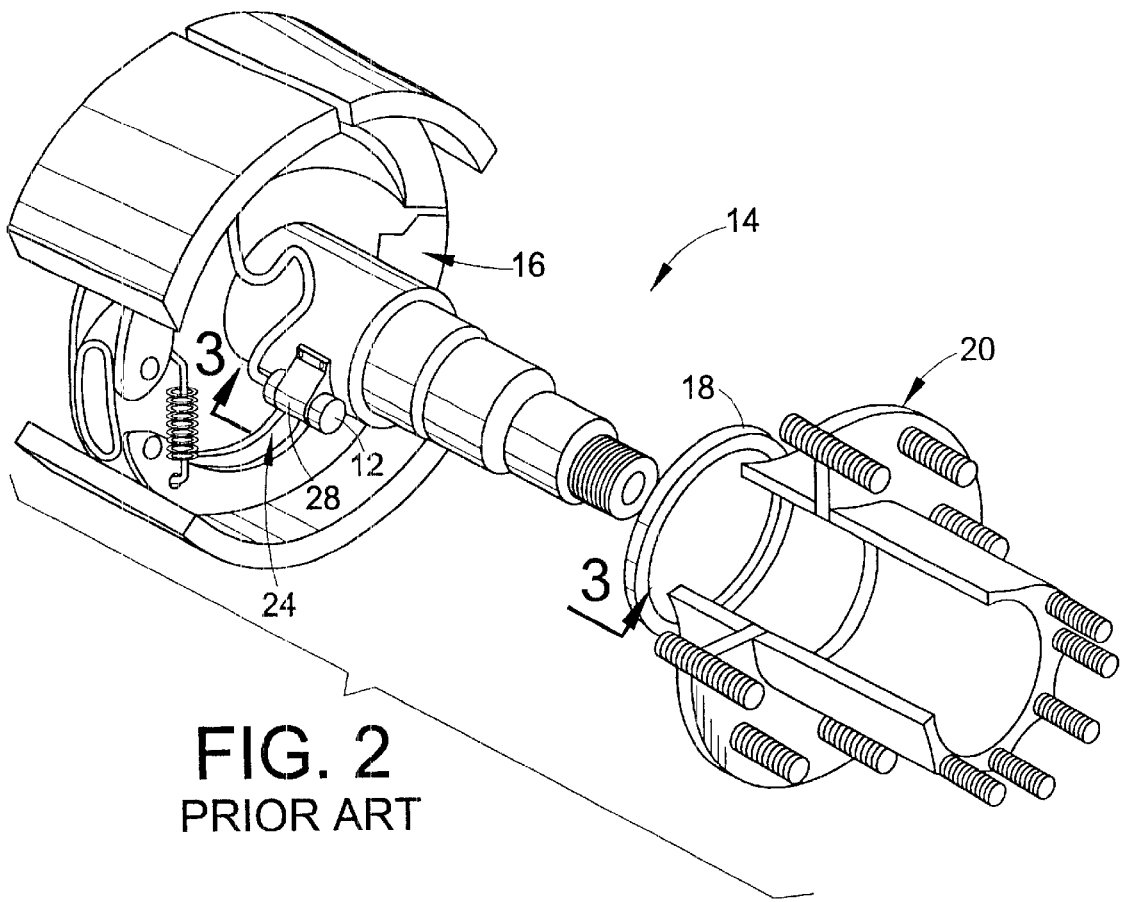
FIG. 2 is an exploded view of a vehicle axle assembly incorporating a prior art sensor retention assembly.

In order to control wheel slippage, antilock braking systems, as shown in FIG. 1, establish servo-feedback control of the brake system to minimize slippage during braking. A typical system uses an antilock braking controller 10 to determine incipient wheel slip and modulates brake pressure based on wheel speed information determined from wheel speed sensors 12 located on each braked wheel axle assembly 14. Each wheel speed sensor 12 is typically mounted to an axle housing 16 as shown in FIG. 2 and FIG. 3, and may use various sensing principles such as magnetic reluctance, Hall effect, or optics as known in the art. The speed sensor 12 must usually be located in close proximity to an exciter 18 or tone wheel, which is mounted to the wheel hub 20, to generate a sufficient electrical signal for input to the controller 10. Between the sensor 12 and exciter 18 is an air gap 22, which requires precise adjustment to generate a strong signal.

As known and used in the art, wheel speed sensor retention assemblies 24 generally fall into three types based on the type of sensor 12 retention. The first fixed type uses retention methods which establish the air gap 22 due to accurately machined interfaces and precision tolerances between the various wheel assembly components. The sensor 12 is positively retained and generally the air gap 22 is predetermined by machined dimensions and is non-adjustable. Representative patents of this type of retention method are U.S. Pat. Nos. 5,006,797 and 4,075,520.

A second locking type of retention assembly 24 allows adjustment of the air gap 22. The sensor 12 is locked after adjustment, usually with threaded fasteners or a clamping type mechanism, once the sensor 12 is in the proper position relative to the exciter 18. U.S. Pat. Nos. 5,650,720 and 4,510,408 show clamping mechanisms for retaining a speed sensor.

Figure 4:
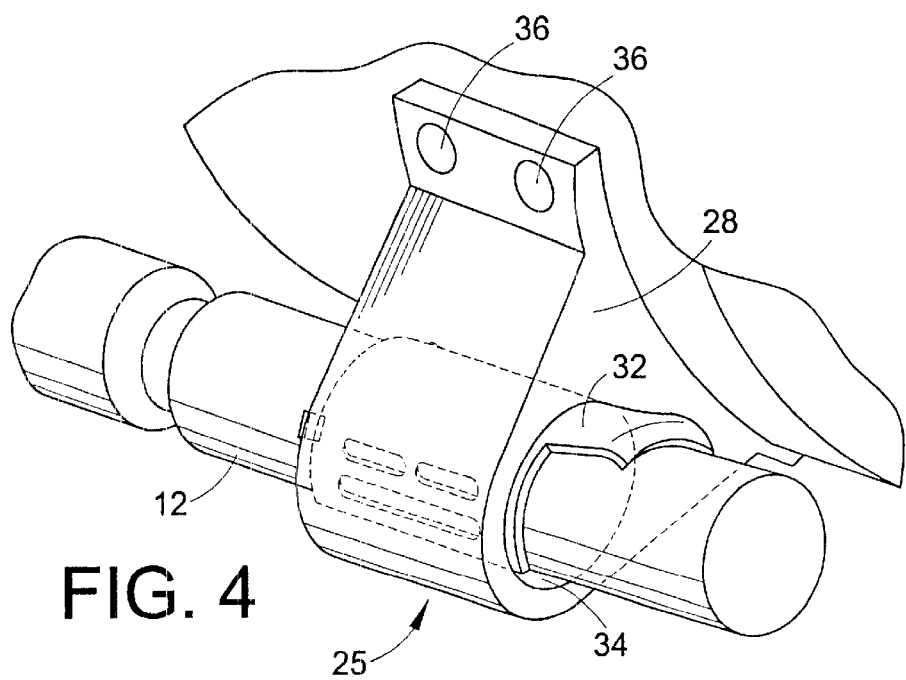
FIG. 4 is a cross-sectional view of the prior art sensor retention assembly taken along the line 3—3 in FIG. 2.

The third self-adjusting type of sensor retention assembly 24 depends on a resilient metallic or elastomeric bushing or spring to provide a friction force sufficient to retain the senor 12. Friction based retention methods are depicted in U.S. Pat. Nos. 4,090,099 and 3,793,545. FIG. 3 shows a retention method using a sensor retainer bushing 26 more clearly seen in FIG. 4. This type of retention method allows relatively simple installation and adjustment without tools. The sensor 12 is fully inserted into the bracket 28 by a straight axial push until it contacts the exciter 18. Any run-out axial movement of the exciter 18 then contacts the sensor 12 to drive it back until the minimum required air gap 22 is achieved.

Each of these types of sensor retention has characteristic disadvantages. The fixed type requires complex accurate machining and depends on the manufacturing tolerance buildup to establish the air gap 22, increasing manufacturing cost. Furthermore, installation and adjustment of the sensor 12 in the vehicle requires assembly of multiple components with tools. The locking type of retention system requires adjustment of the sensor position to a precisely measured air gap 22. This requires a relatively complex installation with tools and adjustment using a measuring device. The self-adjusting type of sensor retention system is easy to manufacture, install and adjust, but may allow the sensor 12 to be inadvertently moved out of position by impact during vehicle assembly and repairs or by road debris during use because it is not positively locked into position.

DETAILED DESCRIPTION OF THE PREFERRED EMBODIMENT

The following description of the preferred embodiment is merely exemplary in nature, and is in no way intended to limit the invention or its application or uses.

Figure 5:
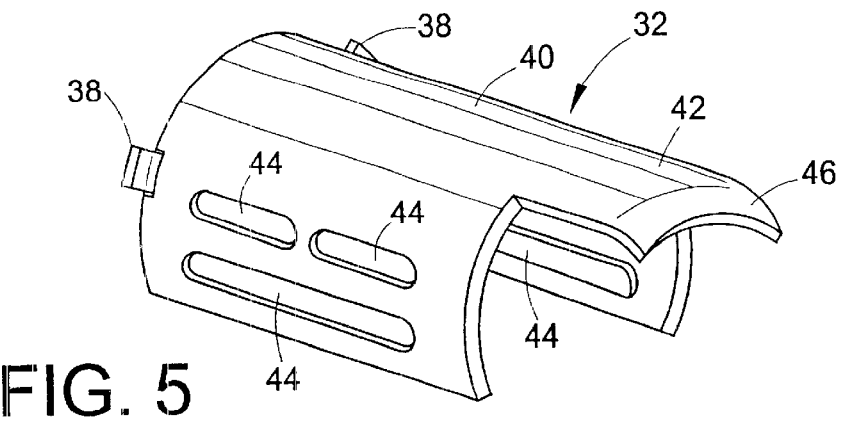
FIG. 5 is a perspective view of the Speed Sensor Retaining Assembly of the present invention.

The speed sensor retention assembly 25 is a further improvement of the assembly 24 depicted in FIG. 3 as shown in FIG. 5. The three principal components of the system are the speed sensor 12, the mounting bracket 28 and the sensor retainer bushing 32.

The speed sensor 12 is typically an existing stock component of cylindrical shape. The speed sensor 12 may use a number of sensor technologies well known in the art which generate pulses in response to exciter 18 rotation such as magnetic reluctance, Hall effect, or optical sensors. The sensor 12 depicted is a magnetic variable reluctance type. The sensor 12 need not be of cylindrical shape and could have a non-circular cross-section with a correspondingly shaped mounting bracket hole 34 and bushing 32.

The mounting bracket 28 provides a clearance hole 34 sized to fit the sensor 12 and bushing 32 and the necessary mounting features 36 for attachment to the vehicle axle housing 16. If desired the mounting bracket can be an integral portion of the axle housing 16.

Figure 6:
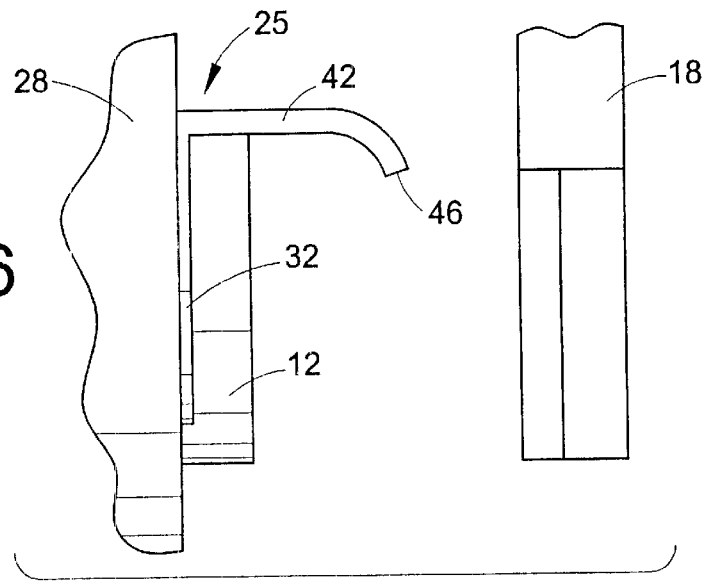
FIG. 6 shows the sensor retention bushing of the present invention.

The bushing 32, shown in greater detail in FIG. 6, is sized to fit within the gap between the mounting bracket hole 34 and the sensor 12. The bushing 32 is typically manufactured by stamping and forming spring steel and has collar prongs 38, body 40 and a locking prong 42. Resilient areas 44 of the bushing body 40 are sized to deflect outwardly when the sensor 12 is inserted, acting as wave springs to apply a frictional force which partially retains the sensor 12.

The locking prong 42 is a fingerlike extension of the bushing body 40 at the end opposite the collar prongs 38. In its non-deflected state it is in a position to interfere with the sensor 12 when inserted. The locking prong 42 is curved inward at its end 46 so that the end 46 engages the sensor 12 when deflected. The sharp end 46, being of a harder material, tends to slightly indent the sensor 12 body and further increase sensor retention. If desired, multiple locking prongs 42 may be used on a bushing 32. Additionally, the prong 42 may be shaped to conform to the sensor 12, in this case to match the sensor's circular cross section. The curved section also serves to stiffen the prong, improving the sensor retention and bushing retention functions.

Figure 7:
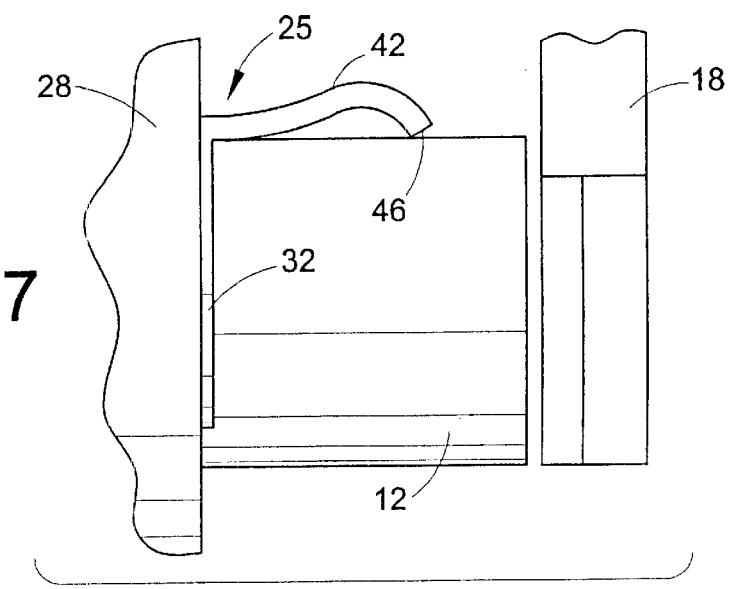
FIG. 7 is a side view of FIG. 5.
Figure 8:
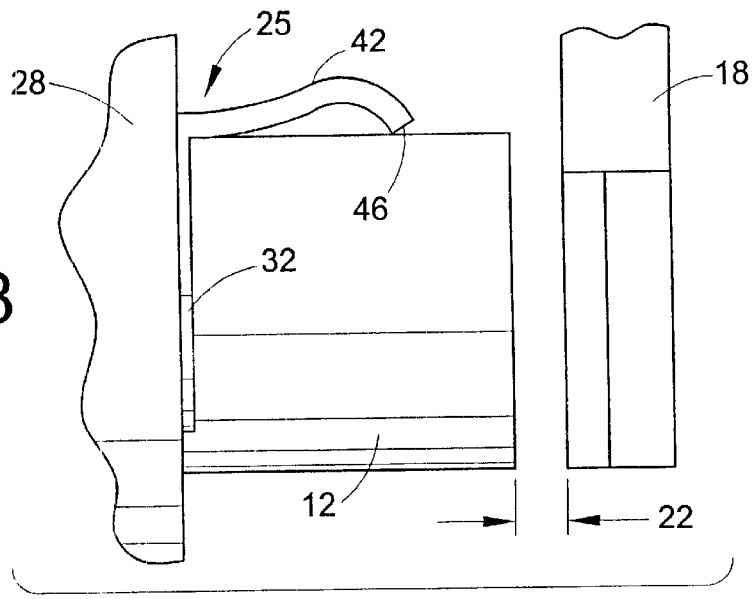
FIG. 8 is a side view of FIG. 5 showing a fully inserted sensor.
Figure 9:
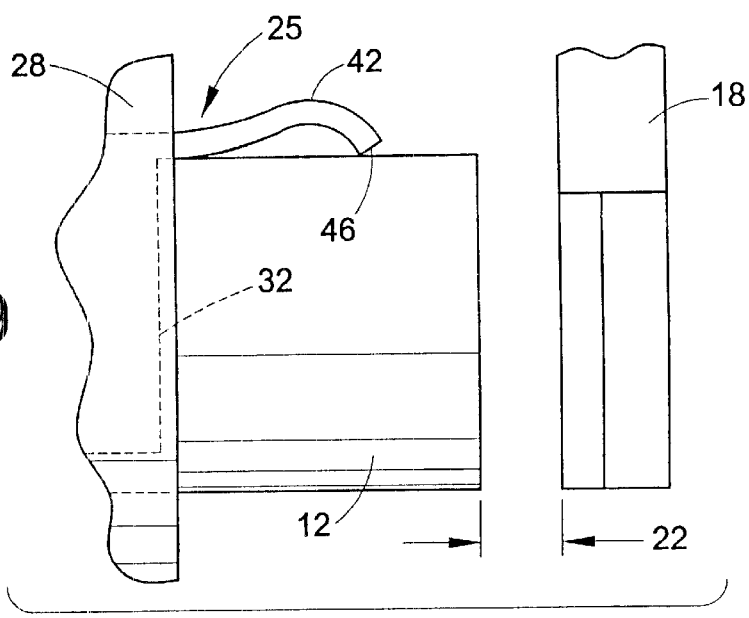
FIG. 9 is a side view of FIG. 5 after air gap creation.
Figure 10:
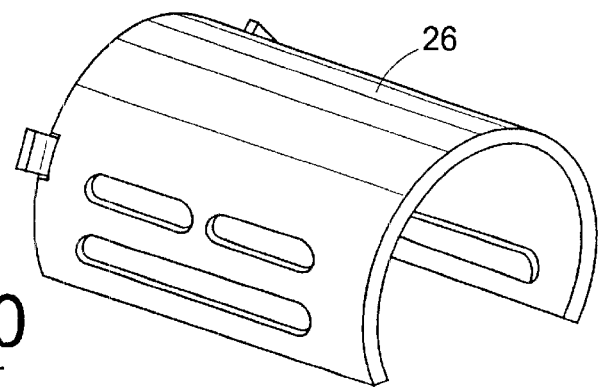
FIG. 10 is a side view of FIG. 5 showing the self locking features of the present invention.

The functioning of the locking prong 42 is shown in FIGS. 7 through 10. To assemble a sensor 12 to a mounting bracket 28, the bushing 32 is first fully axially inserted into the hole 34 until the collar prongs 38 contact the mounting bracket 28. The sensor 12 is then partially inserted, but does not yet deflect the locking prong 42 as shown in FIG. 7. The sensor 12 is then fully inserted, deflecting the locking prong 42 outward and engaging an edge of the locking prong end 46 on the sensor 12 due to spring loading of the prong 42 as shown in FIG. 8. Upon rotation of the exciter 18 by the wheel hub 20, axial run-out motion due to manufacturing tolerances and bearing play will cause the exciter 18 to drive the sensor 12 back to the position shown in FIG. 9 and establish the air gap 22. The locking prong 42 now locks the sensor 12 in relation to the bushing 32, performing the sensor retention function by significantly increasing the force required to move the sensor 12 out of the adjusted position. Relative motion of the bushing 32 to the mounting bracket 28 is also limited. In the direction toward the exciter 18, movement is prevented by the collar prongs 38. Should the bushing 32 be driven in the direction away from the exciter 18, the outward inclined portion of the locking prong 42 will wedge with the mounting bracket 28 to perform the bushing retention function and prevent further motion of the bushing 32 as shown in FIG. 10. This wedging will also increase the normal force of the locking prong 42 on the sensor 12, increasing the sensor retention force.

As a consequence of the operation of the locking prong 42, a self-adjusting type speed sensor retention assembly 25 is provided with the additional security of a locking device that limits motion in the sensor axial direction. This limitation of motion assures that inadvertent movement of the sensor 12 will not occur beyond the sensor's calibration limits. The primary disadvantage of the prior art self-adjusting type of sensor retention assembly 24 is mitigated but the advantages of ease of manufacture, installation and adjustment are preserved.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A wheel speed sensor retention system for a vehicle anti-lock braking system comprising:

a sensor defining a cross section shape;

a sensor mounting bracket having a cavity therethrough conforming with said cross section shape;

a resilient spring bushing fitted within said mounting bracket cavity, said resilient spring bushing having at least one prong, said prong being positioned to interfere with and be deflected outward and spring loaded by said sensor when said sensor is inserted in said bushing, and said prong in the deflected position engaging said sensor mounting bracket to inhibit motion of said bushing and thereby inhibit motion of said sensor.

2. The wheel speed sensor retention system of claim 1 wherein said resilient spring bushing prong in the deflected position forms a wedging surface to resist retraction of said bushing from said mounting bracket cavity.

3. The wheel speed sensor retention system of claim 1 wherein the cross-sectional shape of said sensor is circular.

4. A wheel speed sensor retention system for a vehicle anti-lock braking system comprising:

a sensor defining a cross section shape;

a sensor mounting bracket having a cavity therethrough conforming with said cross section shape;

a resilient spring bushing fitted within said mounting bracket cavity, said resilient spring bushing having at least one prong, said prong being positioned to interfere with and be deflected outward and spring loaded by said sensor when said sensor is inserted in said bushing, and said prong in the deflected position engaging said sensor to inhibit motion of said sensor;

wherein said resilient spring bushing prong has a sharp end and is of a harder material than said sensor, said end indenting said sensor when engaged to further inhibit sensor motion.

5. A wheel speed sensor retention system for a vehicle anti-lock braking system comprising:

a sensor defining a cross section shape;

a sensor mounting bracket having a cavity therethrough conforming with said cross section shape;

a resilient spring bushing fitted within said mounting bracket cavity, said resilient spring bushing having at least one prong, said prong being positioned to interfere with and be deflected outward and spring loaded by said sensor when said sensor is inserted in said bushing, and said prong in the deflected position engaging said sensor to inhibit motion of said sensor;

wherein said resilient spring bushing is formed from beryllium copper alloy.

6. The wheel speed sensor retention system of claim 1 wherein said resilient spring bushing prong is shaped to conform with a portion of said sensor cross section shape.

7. The wheel speed sensor retention system of claim 3 wherein said resilient spring bushing prong is shaped to conform with a portion of said circular cross section shape.

8. A wheel speed sensor retention system for a vehicle anti-lock braking system comprising:

a sensor having a cross section shape;

a sensor mounting bracket having a cavity therethrough conforming with said sensor cross section shape;

a resilient spring bushing fitted within said mounting bracket cavity, said resilient spring bushing being manufactured of material harder than said sensor, said resilient spring bushing having at least one prong, said prong being positioned to interfere with and be deflected outward and spring loaded by said sensor when said sensor is inserted in said bushing, said prong in the deflected position engaging the end of said prong with said sensor to inhibit motion of said sensor and said resilient spring bushing prong in the deflected position forming a wedging surface to resist retraction of said bushing from said mounting bracket cavity.

9. A method of installing a wheel speed sensor comprising the steps of:

attaching a wheel speed sensor mounting bracket proximate to a wheel;

inserting a wheel speed sensor into a bushing, wherein said bushing has a spring-loaded deflection prong to inhibit the movement of the bushing relative to the mounting bracket when the wheel speed sensor is in a data collection position;

inserting the wheel speed sensor and bushing into a first end of an aperture in said wheel speed sensor mounting bracket, wherein said bushing is inserted until the spring-loaded deflection prong clears a second end of the aperture in said wheel speed sensor mounting bracket and thereby moves into an outward deflected position to engage the wheel speed sensor mounting bracket thereby inhibiting movement of the bushing relative to the mounting bracket; and mounting a wheel, wherein the tightening of the wheel contacts the speed sensor moving said speed sensor through the bushing and providing a gap between said wheel and said sensor.

* * * * *